US010171601B2

(12) United States Patent
Mahmoud et al.

(10) Patent No.: US 10,171,601 B2
(45) Date of Patent: Jan. 1, 2019

(54) AVAILABILITY-BASED VIDEO PRESENTATION MANAGEMENT

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 15/242,564

(22) Filed: Aug. 21, 2016

(65) Prior Publication Data

US 2018/0054467 A1    Feb. 22, 2018

(51) Int. Cl.
| | | |
|---|---|---|
| *H04L 29/08* | (2006.01) | |
| *H04L 29/06* | (2006.01) | |
| *H04L 12/58* | (2006.01) | |
| *G06Q 50/00* | (2012.01) | |

(52) U.S. Cl.
CPC ............. *H04L 67/22* (2013.01); *G06Q 50/00* (2013.01); *H04L 51/043* (2013.01); *H04L 51/10* (2013.01); *H04L 51/14* (2013.01); *H04L 51/32* (2013.01); *H04L 65/4084* (2013.01); *H04L 67/306* (2013.01); *H04L 67/24* (2013.01)

(58) Field of Classification Search
CPC ......... H04L 43/08; H04L 51/04; H04L 51/32; H04L 65/60; H04L 67/10; H04L 67/22; H04L 67/306; H04L 51/10; H04L 51/043; H04L 51/14; H04L 65/4084; H04L 67/24; G05Q 50/00
See application file for complete search history.

(56) References Cited

U.S. PATENT DOCUMENTS

| | | | |
|---|---|---|---|
| 6,587,155 B1 | 7/2003 | Xue | |
| 8,537,201 B2 | 9/2013 | Choi et al. | |
| 9,794,603 B1* | 10/2017 | Nijim | H04N 21/2355 |
| 2005/0251820 A1* | 11/2005 | Stefanik | H04N 5/445 |
| | | | 725/34 |
| 2008/0052389 A1 | 2/2008 | George et al. | |

(Continued)

OTHER PUBLICATIONS

Davies, RP. et al.; "Optimizing Video Advertisements"; http://ip.com/IPCOM/000239762D; Dec. 1, 2014.

(Continued)

*Primary Examiner* — Alina A Boutah
(74) *Attorney, Agent, or Firm* — Erik K. Johnson (57) ABSTRACT

Disclosed aspects relate to availability-based video presentation management using a social networking environment. A user request for a provision of a set of contents is received from a user of the social networking environment. A video request to present at least one video of a set of videos to the user in advance of the provision of the set of contents is detected. A set of user profile data in the social networking environment is analyzed with respect to a busyness factor for the user. Based on the set of user profile data with respect to the busyness factor, a selected video of the set of videos is determined. In response to determining the selected video of the set of videos, the selected video of the set of videos is presented to the user in advance of the provision of the set of contents.

20 Claims, 4 Drawing Sheets

(56) References Cited

U.S. PATENT DOCUMENTS

| | | | | |
|---|---|---|---|---|
| 2008/0066107 A1* | 3/2008 | Moonka | G06F 17/30796 | 725/42 |
| 2009/0006191 A1* | 1/2009 | Arankalle | G06Q 30/02 | 705/14.71 |
| 2009/0094114 A1 | 4/2009 | Rice et al. | | |
| 2009/0216607 A1* | 8/2009 | Bartholomew | G06Q 30/02 | 705/14.49 |
| 2013/0013418 A1* | 1/2013 | Novikov | G06Q 30/02 | 705/14.66 |
| 2013/0159112 A1* | 6/2013 | Schultz | G06Q 30/02 | 705/14.66 |
| 2014/0047479 A1* | 2/2014 | Kunisetty | H04N 21/25841 | 725/46 |
| 2015/0007230 A1* | 1/2015 | Bulava | H04N 21/4312 | 725/41 |
| 2015/0213516 A1* | 7/2015 | Jeremias | G06Q 30/0277 | 705/14.73 |
| 2015/0287105 A1* | 10/2015 | Gupta | G06Q 30/0277 | 705/14.73 |
| 2016/0034979 A1 | 2/2016 | Steelberg et al. | | |
| 2016/0117740 A1* | 4/2016 | Linden | G06Q 30/0277 | 705/14.66 |
| 2016/0191650 A1* | 6/2016 | Rong | H04L 67/306 | 709/213 |
| 2017/0289287 A1* | 10/2017 | Modi | H04L 67/26 | |
| 2017/0310789 A1* | 10/2017 | Thomee | H04L 51/32 | |
| 2018/0084023 A1* | 3/2018 | Stoop | H04L 65/601 | |

OTHER PUBLICATIONS

Anonymously; "Advertisement Performance Prediction and Selection"; http://ip.com/IPCOM/000236879D; May 20, 2014.

Karthikeyan, M. et al.; "Method and System for Real-time Transcoding of Video Advertisements"; http://ip.com/IPCOM/000242044D; Jun. 16, 2015.

Anonymously; "Channel Promotion Companion to In-Stream Video Advertisement"; http://ip.com/IPCOM/000238039D; Jul. 28, 2014.

Gupta, Saurabh; "Know Your Gmail Stats using Gmail Meter"; <http://gmailblog.blogspot.com/2012/04/knowyourgmailstatsusing-gmailmeter.html>, Aug. 21, 2016.

International Business Machines Corporation; "Finding available time in IBM Lotus Notes V8 using the Scheduler UI"; <http://www.ibm.com/developerworks/lotus/library/notes8time/>, Aug. 21, 2016.

Neidlinger, Julie; "What 10 Studies Say About the Best Times to Post on Social Media"; <http://coschedule.com/blog/best-times-to-post-on-social-media/>, Aug. 21, 2016.

* cited by examiner

AVAILABILITY-BASED VIDEO PRESENTATION MANAGEMENT

BACKGROUND

This disclosure relates generally to computer systems and, more particularly, relates to availability-based video presentation management using a social networking environment. Video presentation management may be desired to be performed as efficiently as possible. The amount of data that needs to be managed with respect to video presentation is increasing. As data needing to be managed increases, the need for management efficiency may increase.

SUMMARY

Aspects of the disclosure relate to advertising/commercial videos that may be presented before a set of contents which have been requested by a user in order to benefit a user-experience. A free/busy schedule of a user may be analyzed based on various types of user profile data from in a social networking environment with respect to busyness of the user for that time-frame. Aspects may present chosen frame-sets or versions of a video advertisement based on a free/busy schedule of the user. For instance, only key frame-sets may be presented to the user if the user is very busy. The full length of the video advertisement may be presented to the user if the user is not busy.

Aspects of the disclosure relate to availability-based video presentation management using a social networking environment. A user request for a provision of a set of contents is received from a user of the social networking environment. In response to receiving the user request for the provision of the set of contents, a video request to present at least one video of a set of videos to the user in advance of the provision of the set of contents is detected. A set of user profile data in the social networking environment is analyzed with respect to a busyness factor for the user. Based on the set of user profile data with respect to the busyness factor, a selected video of the set of videos is determined for presentation to the user in advance of the provision of the set of contents. In response to determining the selected video of the set of videos, the selected video of the set of videos is presented to the user in advance of the provision of the set of contents.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to advertising/commercial videos that may be presented before a set of contents which have been requested by a user in order to benefit a user-experience. A free/busy schedule of a user may be analyzed based on various types of user profile data from in a social networking environment with respect to busyness of the user for that time-frame. Aspects may present chosen frame-sets or versions of a video advertisement based on a free/busy schedule of the user. For instance, only key frame-sets may be presented to the user if the user is very busy. The full length of the video advertisement may be presented to the user if the user is not busy.

Advertisements (e.g., commercial videos) can appear immediately before a user needs/desires to browse and discover information. The user may not have the option to skip the video immediately in order to focus on the content of the page or video. Further, if the user is not interested in the commercial at all, the user may be particularly annoyed when the user has little free time. To illustrate, features described herein can utilize various tools to determine a messaging traffic pattern of a user in order to determine when the user is busy at any particular moment. Aspects may utilize free/busy time look-up capabilities provided by various scheduling/calendar applications to determine busyness of the user (e.g., currently busy in a meeting, free the rest of the afternoon) at various moments. Aspects may infer a state (e.g., free/busy) of an instant messaging user to determine whether the user is currently using the instant messaging application. It may be determined whether the user is busy using messages posted on social networking websites. Such user data may be consolidated to determine whether the user is currently free or busy. Aspects described herein can determine whether the complete advertisement should be presented to the user or if only various key frame-sets should be presented.

Aspects of the disclosure include a method, system, and computer program product for availability-based video presentation management using a social networking environment. A user request for a provision of a set of contents (e.g., video content data) is received from a user of the social networking environment. In response to receiving the user request for the provision of the set of contents, a video request to present at least one video of a set of videos to the user in advance of the provision of the set of contents is detected. A set of user profile data in the social networking environment is analyzed with respect to a busyness factor for the user. Based on the set of user profile data with respect to the busyness factor, a selected video of the set of videos is determined for presentation to the user in advance of the provision of the set of contents. In response to determining the selected video of the set of videos, the selected video of the set of videos is presented to the user in advance of the provision of the set of contents.

In embodiments, the set of user profile data includes at least one of a messaging traffic pattern for the user, a set of calendar entries for the user, an instant message availability status for the user, or a social media activity pattern for the user. The busyness factor may have a temporal factor which indicates a user status for at least one of a current moment or a temporal window. In various embodiments, the video request to present at least one video of the set of videos relates to an advertisement. In certain embodiments, the availability-based video presentation management is configured for a set of advertisements related to the advertisement. The selected video can include a set of key frames of the set of videos and the set of key frames may be related to a transition. Altogether, the availability-based video presentation management may be associated with performance or efficiency benefits (e.g., data security, application stability, speed, flexibility, load balancing, responsiveness, resource usage, productivity). Aspects may save resources such as bandwidth, processing, or memory.

Figure 1:
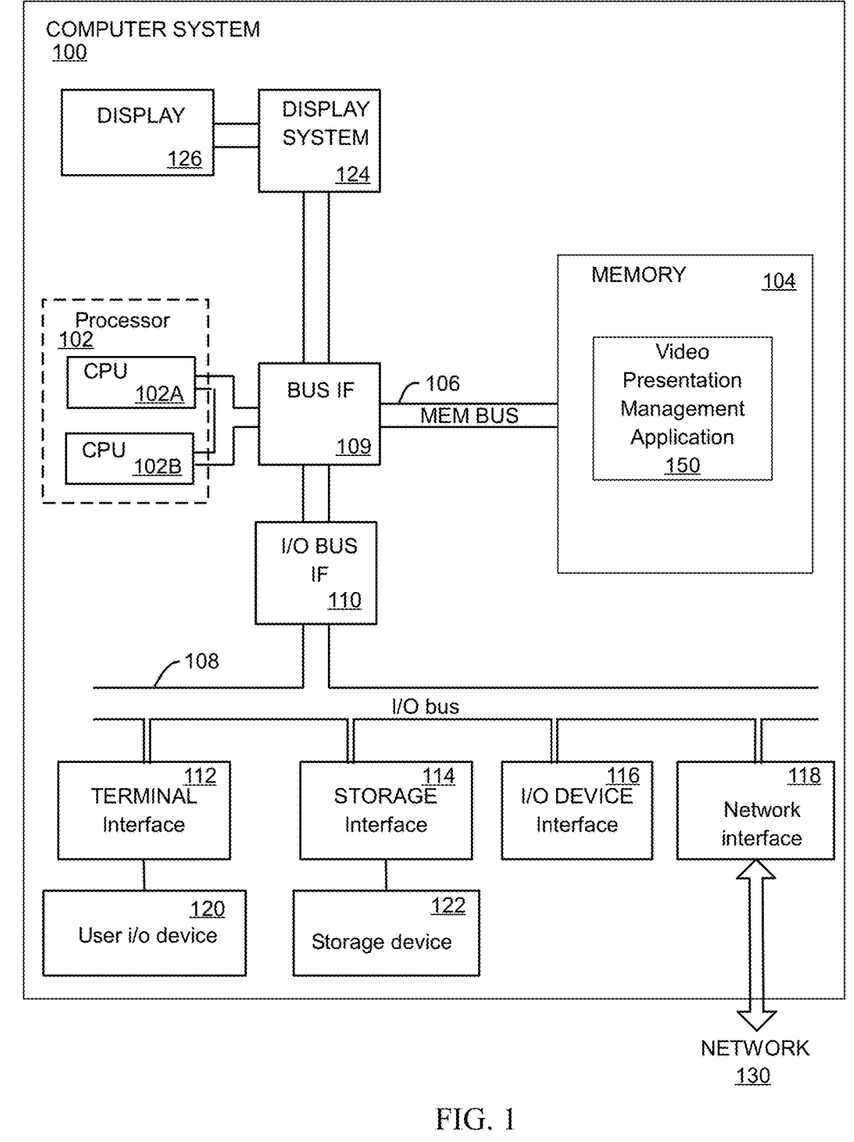
FIG. 1 depicts a high-level block diagram of a computer system for implementing various embodiments of the present disclosure.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a video presentation management application 150. In embodiments, the video presentation management application 150 may include instructions or statements that execute on the processor 102 or instructions or statements that are interpreted by instructions or statements that execute on the processor 102 to carry out the functions as further described below. In certain embodiments, the video presentation management application 150 is implemented in hardware via semiconductor devices, chips, logical gates, circuits, circuit cards, and/or other physical hardware devices in lieu of, or in addition to, a processor-based system. In embodiments, the video presentation management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
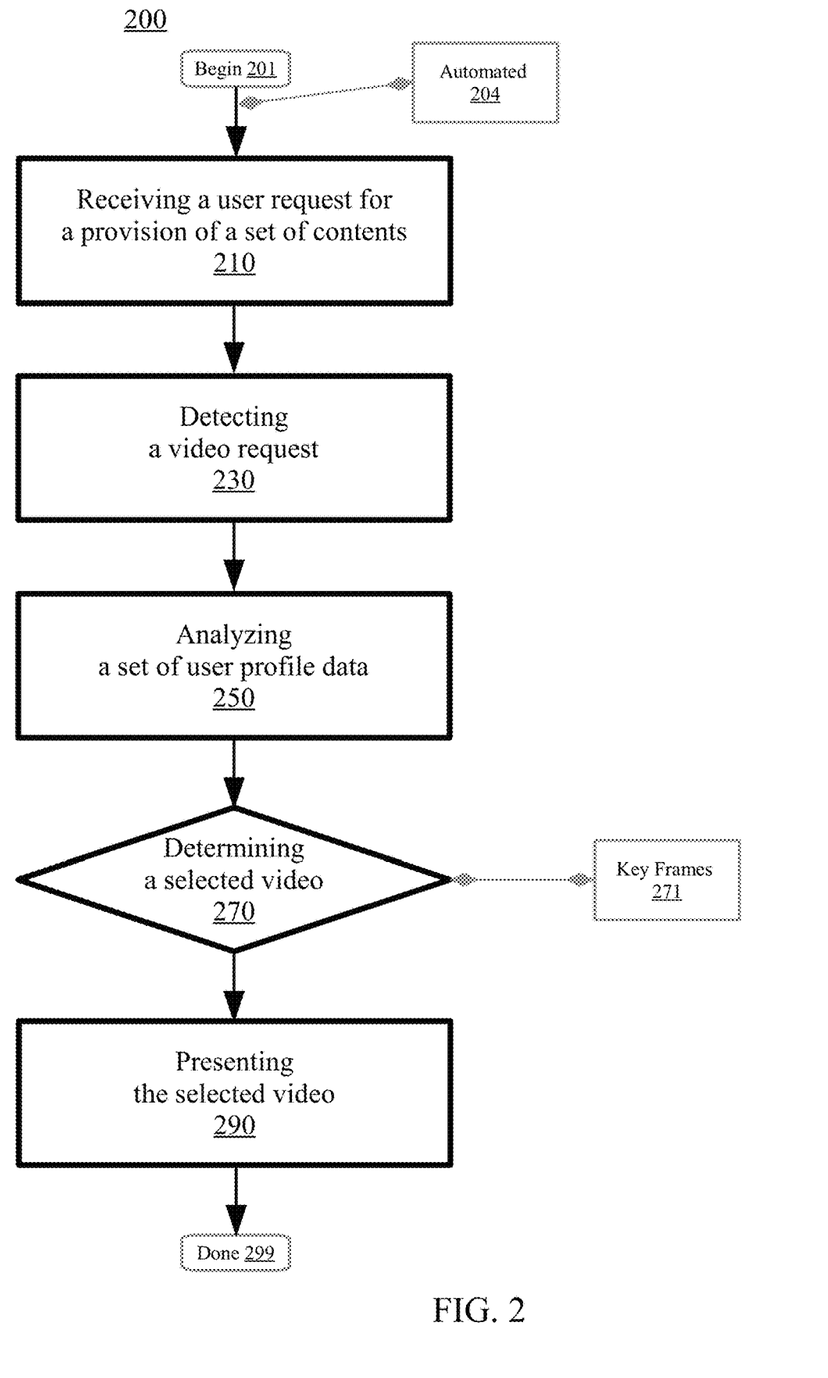
FIG. 2 is a flowchart illustrating a method for availability-based presentation management according to embodiments.

FIG. 2 is a flowchart illustrating a method 200 for availability-based presentation management according to embodiments. The method 200 may begin at block 201. The availability-based presentation management may use a social-networking environment. The social networking environment can include a selection from a group consisting of at least one of: e-mail, calendar, instant messaging (IM), short message services (SMS), wiki, community (e.g., micro-blog, professional connections, photo-sharing), newsfeed, project collaboration, or the like. In embodiments at block 204, the operational steps such as the receiving, the detecting, the analyzing, the determining, and the presenting each occur in an automated fashion without user intervention or manual action (e.g., using automated computing machinery, fully machine-driven without manual stimuli). The automated operational steps may be performed by a management engine (e.g., as part of the social networking environment).

At block 210, a user request for a provision of a set of contents is received from a user of the social networking environment. The user can include a computer, a virtual machine, an application, an individual utilizing a computer, or the like. The user may initiate the user request via keystrokes, touchscreen touches/pushes, swipes, mouse-movement/clicks, eye-gazing, or the like. The user request can include an input, command, query, message, data packet, or the like. Accordingly, the user request may be requesting performance of one or more actions/operations. A provision can include providing via transmitting, sending, broadcasting, playing, conveying, displaying, presenting, messaging, publishing, notifying, or the like. The set of contents can include information such as numerical data, moving images, still images, photographs, diagrams, schematics, documents, tables, numbers, text, audio, video, or other data. For instance, the set of contents may have video content data which is found on a network such as the world wide web, the internet, a corporate intranet, or the like. Receiving can include detecting, sensing, accepting as an input, or the like. For example, a user may click play on a graphical user interface of a web page configured to present a video related to how to make/cook vegetable chili. A management engine may receive such a user request.

At block 230, a video request to present at least one video of a set of videos to the user in advance of the provision of the set of contents is detected. The detection may occur in response to receiving the user request for the provision of the set of contents. Detecting can include receiving, sensing, discovering, acquiring, identifying, or the like. The set of videos (e.g., audio, moving images) can include various media clips such as advertisements, commercials, public service announcements, weather event notifications, or the like. The set of videos may or may not be related to the set of contents (e.g., same subject matter, similar subject matter, different subject matter). The video request can be detected by the management engine. The video request may be requesting performance of one or more actions/operations. For example, the website on which the user clicked play may submit/facilitate the video request (e.g., enable/allow advertisements in order to pay for their content production related to how to make/cook vegetable chili). The user may or may not be amenable to such a video; however, in order to receive the set of contents, the user may be required (e.g., by the website) to have the video presented to the user. For example, the management engine may detect an advertisement for soup bowls is being requested to be presented to the user prior to presenting the vegetable chili video that the user requested.

At block 250, a set of user profile data in the social networking environment is analyzed. The analysis may occur with respect to a busyness factor for the user. The busyness factor for the user may indicate whether or to what extent the user is busy, engaged, able to be disturbed/interrupted/communicated-with, or occupied. The busyness factor may have a numerical value (e.g., 0 corresponds with do not disturb, 100 corresponds with available, 10 corresponds with contact is only allowed by immediate family members or a corporate chief executive). The busyness factor may be derived from various information sources (e.g., user profile data) in the social networking environment. The set of user profile data can include user role/importance (e.g., based on an organizational hierarchy), user history (e.g., based on prior similar events), user biometrics (e.g., based on a heart rate), user busyness/availability (e.g., based on an electronic calendar/schedule), user computing activities (e.g., based on data traffic or application usage), user preferences (e.g., based on favored/disfavored typologies such as enjoyment of food-related items, prefers audio over text), or the like. For example, the management engine may analyze the set of user profile data to ascertain how much time, potential patience, and available spending money a user for an advertisement (e.g., less time when in a hurry to take children to soccer practice in 30 minutes, more time on a lazy Saturday afternoon without any activities scheduled for the entire weekend).

For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use.

At block 270, a selected video of the set of videos is determined for presentation to the user. The presentation to the user may occur in advance of (e.g., prior to, before) the provision of the set of contents. The determination may be made based on the set of user profile data with respect to the busyness factor. Determining can include ascertaining, identifying, resolving, evaluating, formulating, computing, calculating, comparing, or the like. The selected video (e.g., a chosen advertisement) may include one or more of the set of videos. For instance, the set of videos may include a first soup bowl advertisement which is 5 seconds in length, a second soup bowl advertisement which is 15 seconds in length, and a third soup bowl advertisement which is 30 seconds in length. The selected video may include the third soup bowl advertisement on a lazy Saturday afternoon. Alternatively, for example, the selected video may include (only) the first soup bowl advertisement when the user may be in a hurry (e.g., soccer practice is upcoming). However, in certain instances, the selected video may include the second soup bowl video regardless of whether the user may be in a hurry when the user has a recent computing history of being in search of purchasing soup bowls. Accordingly, the determination of the selected video can incorporate both the set of user profile data and the busyness factor as described herein. For example, user busyness, user computing activities, and user preferences may be compared in order to select videos of an appropriate duration, subject matter, and presentation style (e.g., fade-in, animated graphics, audio-centric). Various combinations of aspects of the set of user profile data and the busyness factor are considered. To illustrate, the second soup bowl advertisement may be configured as a default unless the busyness factor achieves a threshold. As such, a busyness factor below 20 may always yield a shorter duration selected video (e.g., the first soup bowl advertisement) or a busyness factor above 85 may always yield a longer duration selected video (e.g., the third soup bowl advertisement).

In embodiments, the selected video includes a set of key frames of the set of videos at block 271. For instance, the user may be interested in purchasing new soup bowls based on the set of user profile data. The user may have a busyness factor which indicates to present a very short duration video (e.g., no longer than 4 seconds). The first and second soup bowl advertisements may not be as thorough/in-depth as portions of the third soup bowl advertisement with respect to various particularities of the user (e.g., the set of user profile data may indicate e-mails or web browsing principally related to rectangular soup bowls). Accordingly, a set of key frames which include one or more video portions may be extracted and linked together. For example, a first video of pouring soup into the rectangular soup bowl and a second video which moves the rectangular soup bowl to a dining table may be presented (e.g., thereby not presenting videos of stacking/moving circular soup bowls into a cabinet). In various embodiments, the set of key frames may be related to a transition. For example, the transition can include the soup bowls going from empty to filled (e.g., one second in duration), or from the kitchen to the dining room (e.g., two seconds in duration). Transitions may relate to various changes in environmental settings or the process/period of changing from one state to another. Transitions can include audio, still image, video, or other effects (e.g., color/brightness/sound/object/person configurations).

At block 290, the selected video of the set of videos is presented to the user. The presentation may occur in response to (e.g., subsequent to) determining the selected video of the set of videos. The presentation may occur in advance of the provision of the set of contents. Presenting can include outputting, communicating, providing, transmitting, sending, broadcasting, playing, conveying, displaying, messaging, printing, publishing, or the like. For example, the management engine may play the selected video (e.g., three-second advertisement which has multiple key frames of a longer advertisement) before thereafter outputting the set of contents (e.g., video for how to make/cook vegetable chili).

Method 200 concludes at block 299. Aspects of method 200 may provide performance or efficiency benefits with respect to availability-based video presentation management. For example, aspects of method 200 may include positive impacts on user-satisfaction, flexibility, responsiveness, or productivity with respect to video presentation management. In embodiments, performance or efficiency benefits when requesting/accessing a set of contents via video may occur (e.g., speed, flexibility, load balancing, responsiveness, productivity).

Figure 3:
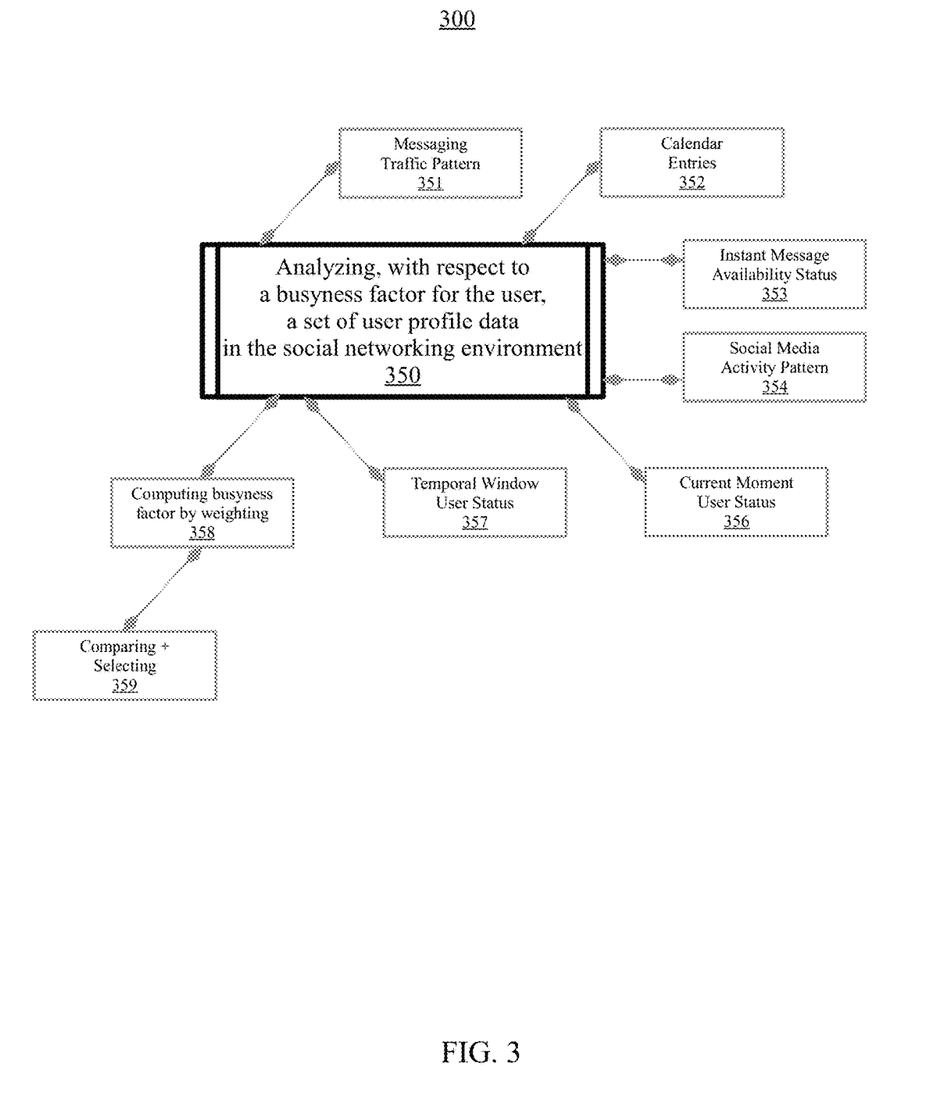
FIG. 3 is a flowchart illustrating a method for availability-based presentation management according to embodiments.

FIG. 3 is a flowchart illustrating a method 300 for availability-based presentation management according to embodiments. Aspects of method 300 may be similar or the same as aspects of method 200 and aspects may be utilized with other methodologies described herein (e.g., method 400). At block 350 (similar to block 250 and block 450), a set of user profile data in the social networking environment is analyzed. The analysis may occur with respect to a busyness factor for the user.

In embodiments, the set of user profile data includes a messaging traffic pattern for the user at block 351. The messaging traffic pattern may indicate an activity model in aggregate or proportional terms. For instance, the messaging traffic pattern can include a rate of e-mail being sent by the user relative to average. The messaging traffic pattern may relate to a size of communication (e.g., instant messages longer than a threshold such as 150 words). The messaging traffic pattern may relate to a frequency of communication (e.g., social media posts or actions approximately every three minutes). As such, monitored/collected data may be compared to a benchmark (e.g., historical norm) to resolve a pattern. For example, the user may have sent three different e-mails in the past five minutes to various other soccer parents (e.g., which may indicate busyness or a pending event).

In embodiments, the set of user profile data includes a set of calendar entries for the user at block 352. The set of calendar entries may include a status for entries such as busy, free, do not disturb, private, secret, public, open, away, or the like. The set of calendar entries may have various locations which may indicate how much time a user has (e.g., needs to drive from home to soccer practice which is roughly fifteen minutes away). The set of calendar entries may indicate a relative importance of the entries such as with respect to timeliness (e.g., getting groceries may be more flexible schedule-wise than having foot surgery). The calendar entries may be retrieved from a cloud environment, various devices, or from various entities such as both personal and work devices/databases.

In embodiments, the set of user profile data includes an instant message availability status for the user at block 353. The instant message availability status for the user may indicate busy, free, do not disturb, invisible, online, offline, available for short interactions, private, secret, public, open, typing, away, at the desk, in the office, at home, on a plane, or the like. The instant message availability status may be ascertained using sensors (e.g., to detect that the user is in the room), via input devices (e.g., mouse movement, typing), or by accessing a configuration (e.g., user has selected to be seen as busy). The instant message availability status can indicate a temporal period. For example, a user may have been away for 34 minutes or is expected to depart for a meeting in 3 minutes. In certain embodiments, the instant message availability status may correspond with the set of calendar entries.

In embodiments, the set of user profile data includes a social media activity pattern for the user at block 354. The social media activity pattern may correspond to various user actions such as sending a message, opening an object, clicking a link, approving of a posting, sharing information, viewing media, or the like. For instance, the social media activity pattern can indicate a user posting work-related content, posting leisure-related content, or the like. Accordingly, the type of content being posted may be correlated by aspects described herein to ascertain a busyness factor. As another example, a management engine may detect how long a website is viewed (e.g., being read), when a user is surfing news websites, or user actions such as clicking links within a social media asset (e.g., a smartphone application). Such examples may indicate varying levels of busyness (e.g., when performed during work hours such activities may indicate a not busy status thereby resulting-in longer selected videos). Other possibilities are considered for the social media activity pattern.

In embodiments, the busyness factor has a temporal factor which indicates a user status for a current moment at block 356. The user status may be detected in a dynamic fashion (e.g., in real-time, on-the-fly, ongoing). The current moment may disregard various factors other than current happenings (e.g., selectively ignore upcoming calendar entries, selective prevent longer videos even if instant messaging indicate availability when the user appears very busy with work-related tasks). Accordingly, the temporal factor may be time-based for as to whether the user is busy/free at this moment, and may incorporate expected time durations for tasks currently being operated-on by the user. For instance, aspects described herein may indicate that the user is working on a project for the corporate chief executive which is due at the end of the day. As such, shorter selected videos may be played. In particular, shorter selected videos may be played when they related to the task at hand (e.g., the video describes how to fill-out a particular bureaucratic form).

In embodiments, the busyness factor has a temporal factor which indicates a user status for a temporal window at block 357. The user status may be detected in a dynamic fashion (e.g., in real-time, on-the-fly, ongoing). The temporal window may include a period of time such as an hour, a day, a week, or the like. In general, the temporal window may have a set of events such as calendar events or the like. For example, the number of calendar events, the total amount of time allotted for such calendar events, or the nature of the calendar events (e.g., personal, professional) may be compared with a benchmark. Achievement (e.g., exceeding) the benchmark may indicate a busy temporal window and not reaching the benchmark may indicate a relatively free temporal window. As such, the temporal factor can indicate a busy/free hour/day/week for the user. For example, Monday mornings may tend to be busy for a user whereas Friday mornings may lack busyness. Various scoring or weighting methodologies may be utilized to compute the user status. The temporal window may include the current time, only future times, only past times, or a combination thereof.

In embodiments, the busyness factor may be computed using a set of operations at block 358. Computing can include resolving, evaluating, calculating, determining, or the like. A messaging traffic pattern for the user, a set of calendar entries for the user, an instant message availability status for the user, or a social media activity pattern for the user may (each) be weighted (e.g., scored on a scale and weighted with a coefficient). The scale may span from 0 to 100 and use 50 as a benchmark for average/normal. Scores above 50 may be deemed busy and scores below 50 may be deemed not busy (e.g., each to varying degrees). Accordingly, the messaging traffic pattern for the user may have a score of 60 with a coefficient of 25%, a set of calendar entries for the user may have a score of 30 with a coefficient of 40%, an instant message availability status for the user may have a score of 90 with a coefficient of 15%, and a social media activity pattern for the user may have a score of 50 with a coefficient of 20%. In total, the example weighted busyness factor may be (0.25*60+0.40*30+ 0.15*90+0.20*50=) 50.5 and can be utilized thereafter.

In various embodiments, a comparison and a selection may be made at block 359. The busyness factor may be compared with a threshold busyness value. When the busyness factor exceeds the threshold busyness value, a first video of a first duration can be selected. Selecting can include, for example, saving a data value (e.g., entering a digit/character in a data store), transmitting a data object (e.g., sending an object having metadata), routing a message (e.g., publishing a startup/wait expectation), or providing/performing/processing an operation (e.g., a notification). When the threshold busyness value exceeds the busyness factor, a second video of a second duration can be selected. In such embodiments, the second duration may exceed the first duration. Accordingly, a busier user yields a shorter video (e.g., by time, by a count of frames). For example, busyness factors exceeding 33 and below 67 may exclude showing of both the longest and the shortest soup bowl advertisements. As such, the second soup bowl advertisement may be selected when the busyness factor is 50.5. In certain embodiments, a particular user may be compared to their own benchmarks such that a busyness factor value such as 50.5 is compared to a baseline for that user (e.g., 50.5 is much less busy than normal for a user who typically has busyness factor values of 80 or more).

Figure 4:
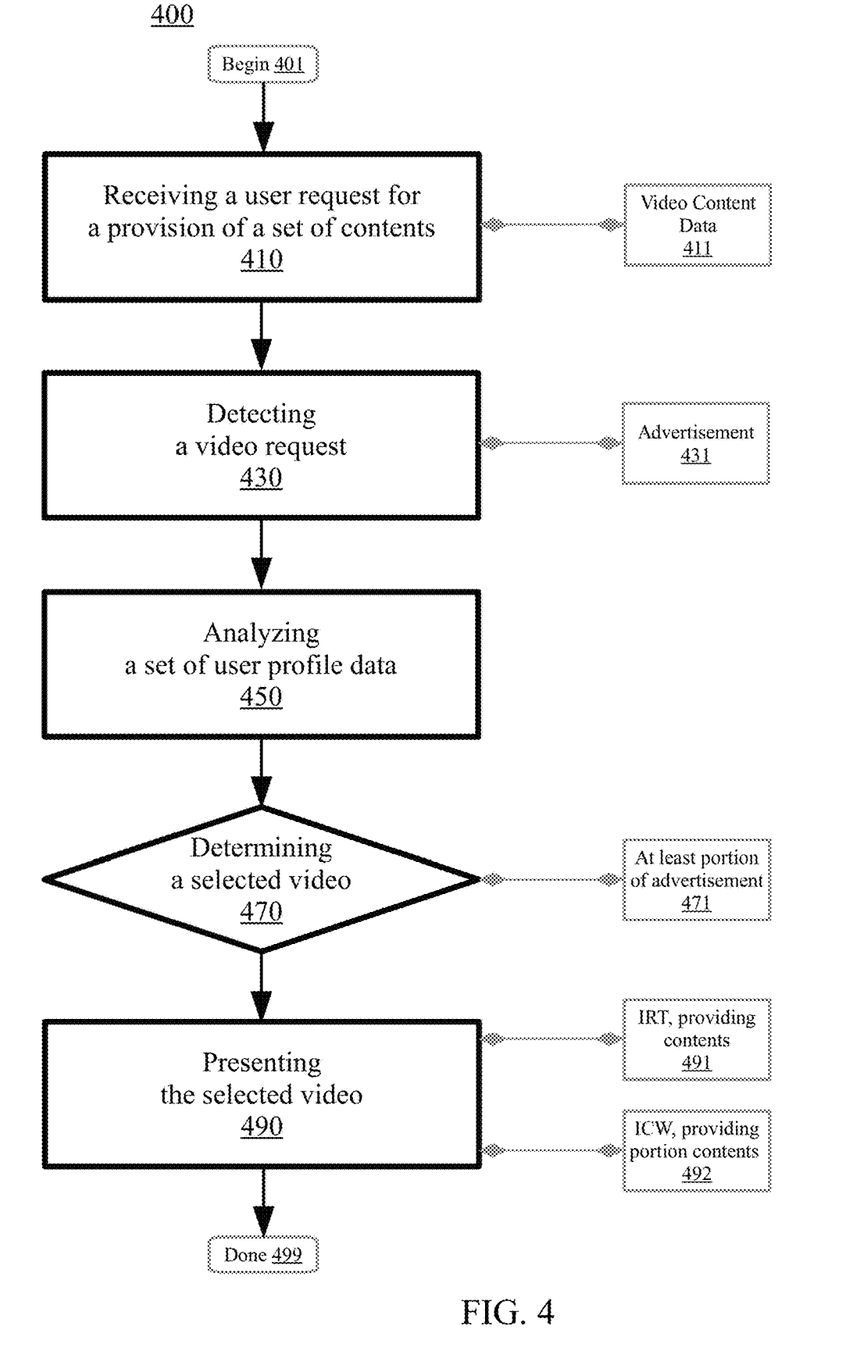
FIG. 4 is a flowchart illustrating a method for availability-based presentation management according to embodiments.

FIG. 4 is a flowchart illustrating a method 400 for availability-based presentation management according to embodiments. Aspects of method 400 may be similar or the same as aspects of method 200 and aspects may be utilized with other methodologies described herein (e.g., method 300). The method 400 may begin at block 401. A user request for a provision of a set of contents (e.g., video content data) is received from a user of the social networking environment at block 410. In embodiments, the set of contents includes video content data at block 411. Video content data can include information to facilitate moving visual media. The video content data may be embedded or linked-to in a social networking environment, website, or the like.

In response to receiving the user request for the provision of the set of contents, a video request to present at least one video of a set of videos to the user in advance of the provision of the set of contents is detected at block 430. In embodiments, the video request to present at least one video of the set of videos relates to an advertisement at block 431. Accordingly, the availability-based video presentation management may be configured for a set of advertisements related to the advertisement. The advertisement may or may not be directly related to the set of contents in form, fit, or function. For example, a set of contents related to pickup trucks may correspond with an advertisement for coffee. As another example, a set of contents having an audio song with lyrics being displayed may correspond with an advertisement for a local karaoke competition.

A set of user profile data in the social networking environment is analyzed with respect to a busyness factor for the user at block 450. Based on the set of user profile data with respect to the busyness factor, a selected video of the set of videos is determined for presentation to the user in advance of the provision of the set of contents at block 470. In embodiments, the selected video of the set of videos includes at least a portion of the advertisement at block 471. For example, the selected video may have a version of a soup bowl advertisement (e.g., a 3-second portion, the first soup bowl advertisement, a portion of the third soup bowl advertisement). In certain embodiments, a user action with respect to the selected video may result in another selected video being presented prior to the set of contents. For instance, if the management engine receives a command from a user which indicates to learn more about what was presented in the selected video, a longer and more in-depth selected video can be presented in advance of presentation of the set of contents. Other possibilities are also contemplated for the selected video and advertisements.

In response to determining the selected video of the set of videos, the selected video of the set of videos is presented to the user in advance of the provision of the set of contents at block 490. In embodiments, the set of contents is provided in response to presenting the selected video of the set of videos at block 491. For example, the first soup bowl advertisement may be played and at the conclusion of it then the vegetable chili video may begin. In certain embodiments, at least a portion of the set of contents is provided in conjunction with presenting the selected video of the set of videos at block 492. For example, the second soup bowl advertisement may be played and a few seconds later the vegetable chili video may begin. Accordingly, the user may be provided an option as to which video to include audio for. In various embodiments, a sensor may detect which of the two videos the user is paying more attention to with the eyes of the user and play audio for that video. Various other possibilities are considered.

In certain embodiments, a usage assessment may be generated with respect to the availability-based video presentation management. Use of the availability-based video presentation management may be metered. For example, service-life extensions may be measured or functional up-time relative to a benchmark (e.g., historical functional up-time) can be evaluated, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use. The generated invoice may be provided (e.g., displayed in a dialog box, sent or transferred by e-mail, text message, initiated for traditional mail) to the user for notification, acknowledgment, or payment.

Method 400 concludes at block 499. Aspects of method 400 may provide performance or efficiency benefits with respect to availability-based video presentation management. For example, aspects of method 400 may include positive impacts on user-satisfaction, flexibility, responsiveness, or productivity with respect to video presentation management. In embodiments, performance or efficiency benefits when requesting/accessing a set of contents via video may occur (e.g., speed, flexibility, load balancing, responsiveness, productivity).

Aspects of the disclosure may relate to blending the commercial video into the content video that the user desires to watch by analyzing various image data. Certain frame-sets or versions of the commercial video may be presented based on an attentiveness or a current free/busy schedule of the user. Features can monitor an attention of the user by analyzing eye gaze activities. If the user is not paying too much attention to the commercial video then the invention system can simply play key frame-sets of the video to the user. If the user shows significant interests to the commercial and is staring at the video since the beginning, then aspects described herein can play the full length of the video. Accordingly, calendar data of the user may be analyzed to determine whether the user is busy or not for a temporal period. If the user is very busy, then the features may only play the key frame-set to the user. If the user is not busy, then the features may play the full length of the video to the user.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for availability-based video presentation management using a social networking environment, the method comprising:
   receiving, from a user of the social networking environment, a user request for a provision of a set of contents;
   detecting, in response to receiving the user request for the provision of the set of contents, a video request to present at least one video of a set of videos to the user in advance of the provision of the set of contents;
   analyzing, with respect to a busyness factor for the user, a set of user profile data in the social networking environment;
   determining, based on the set of user profile data with respect to the busyness factor, a selected video of the set of videos to present to the user in advance of the provision of the set of contents; and
   presenting, in response to determining the selected video of the set of videos, the selected video of the set of videos to the user in advance of the provision of the set of contents.

2. The method of claim 1, wherein the set of user profile data includes a messaging traffic pattern for the user.

3. The method of claim 1, wherein the set of user profile data includes a set of calendar entries for the user.

4. The method of claim 1, wherein the set of user profile data includes an instant message availability status for the user.

5. The method of claim 1, wherein the set of user profile data includes a social media activity pattern for the user.

6. The method of claim 1, wherein the busyness factor has a temporal factor which indicates a user status for a current moment.

7. The method of claim 1, wherein the busyness factor has a temporal factor which indicates a user status for a temporal window.

8. The method of claim 1, further comprising:
   computing the busyness factor by:
      weighting a messaging traffic pattern for the user;
      weighting a set of calendar entries for the user;
      weighting an instant message availability status for the user; and
      weighting a social media activity pattern for the user.

9. The method of claim 8, further comprising:
   comparing the busyness factor with a threshold busyness value; and
   selecting the selected video, wherein the selected video is:
      a first video of a first duration when the busyness factor exceeds the threshold busyness value, and
      a second video of a second duration when the threshold busyness value exceeds the busyness factor, wherein the second duration exceeds the first duration.

10. The method of claim 1, wherein the set of contents includes video content data.

11. The method of claim 10, wherein:
   the video request to present at least one video of the set of videos relates to an advertisement, and the availability-based video presentation management is configured for a set of advertisements related to the advertisement.

12. The method of claim 11, wherein the selected video of the set of videos includes at least a portion of the advertisement.

13. The method of claim 12, further comprising:
providing, in response to presenting the selected video of the set of videos, the set of contents.

14. The method of claim 12, further comprising:
providing, in conjunction with presenting the selected video of the set of videos, at least a portion of the set of contents.

15. The method of claim 1, wherein:
the selected video includes a set of key frames of the set of videos, and
the set of key frames relates to a transition.

16. The method of claim 1, wherein the detecting, the analyzing, the determining, and the presenting each occur in an automated fashion without user intervention.

17. The method of claim 1, further comprising:
metering use of the availability-based video presentation management; and
generating an invoice based on the metered use.

18. A system for availability-based video presentation management using a social networking environment, the system comprising:
a memory having a set of computer readable computer instructions, and
a processor for executing the set of computer readable instructions, the set of computer readable instructions including:
receiving, from a user of the social networking environment, a user request for a provision of a set of contents;
detecting, in response to receiving the user request for the provision of the set of contents, a video request to present at least one video of a set of videos to the user in advance of the provision of the set of contents;
analyzing, with respect to a busyness factor for the user, a set of user profile data in the social networking environment;
determining, based on the set of user profile data with respect to the busyness factor, a selected video of the set of videos to present to the user in advance of the provision of the set of contents; and
presenting, in response to determining the selected video of the set of videos, the selected video of the set of videos to the user in advance of the provision of the set of contents.

19. A computer program product for availability-based video presentation management using a social networking environment, the computer program product comprising a computer readable storage medium having program instructions embodied therewith, wherein the computer readable storage medium is not a transitory signal per se, the program instructions executable by a processor to cause the processor to perform a method comprising:
receiving, from a user of the social networking environment, a user request for a provision of a set of contents;
detecting, in response to receiving the user request for the provision of the set of contents, a video request to present at least one video of a set of videos to the user in advance of the provision of the set of contents;
analyzing, with respect to a busyness factor for the user, a set of user profile data in the social networking environment;
determining, based on the set of user profile data with respect to the busyness factor, a selected video of the set of videos to present to the user in advance of the provision of the set of contents; and
presenting, in response to determining the selected video of the set of videos, the selected video of the set of videos to the user in advance of the provision of the set of contents.

20. The computer program product of claim 19, wherein at least one of:
the program instructions are stored in the computer readable storage medium in a data processing system, and wherein the program instructions were downloaded over a network from a remote data processing system; or
the program instructions are stored in the computer readable storage medium in a server data processing system, and wherein the program instructions are downloaded over a network to the remote data processing system for use in a second computer readable storage medium with the remote data processing system.

* * * * *